US011729140B2

(12) United States Patent
Colliaux (10) Patent No.: US 11,729,140 B2
(45) Date of Patent: Aug. 15, 2023

(54) METHOD AND SYSTEM FOR MANAGING DHCP SERVERS (71) Applicant: SAGEMCOM BROADBAND SAS, Rueil Malmaison (FR)

(72) Inventor: Mathieu Colliaux, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 0 days.

(21) Appl. No.: 17/416,000

(22) PCT Filed: Dec. 19, 2019

(86) PCT No.: PCT/EP2019/086231
§ 371 (c)(1),
(2) Date: Jun. 18, 2021

(87) PCT Pub. No.: WO2020/127680
PCT Pub. Date: Jun. 25, 2020

(65) Prior Publication Data
US 2022/0078160 A1 Mar. 10, 2022

(30) Foreign Application Priority Data
Dec. 20, 2018 (FR) ...................................... 1873530

(51) Int. Cl.
*H04L 61/5014* (2022.01)
*H04W 24/08* (2009.01)
(Continued)

(52) U.S. Cl.
CPC ...... *H04L 61/5014* (2022.05); *H04L 61/5053* (2022.05); *H04W 24/04* (2013.01); *H04W 24/08* (2013.01)

(58) Field of Classification Search
CPC . H04L 41/0663; H04L 41/0668; H04L 61/50; H04L 61/5007; H04L 61/5014;
(Continued)

(56) References Cited

U.S. PATENT DOCUMENTS

2006/0155833 A1* 7/2006 Matsuda ................. H04L 61/50
709/220
2006/0218252 A1* 9/2006 Ford .................... H04L 61/5014
709/223
(Continued)

OTHER PUBLICATIONS

Lin, Changsheng, Tian Su, and Zhiqian Wang. "Summary of high-availability DHCP service solutions." 2011 4th IEEE International Conference on Broadband Network and Multimedia Technology. IEEE, 2011. (Year: 2011).*
(Continued)

*Primary Examiner* — Vivek Srivastava
*Assistant Examiner* — William C McBeth
(74) *Attorney, Agent, or Firm* — Oliff PLC; R. Brian Drozd (57) ABSTRACT

A wireless communication coverage extension system comprises a backhaul subnetwork that includes a set of interconnected nodes. A plurality of nodes of the backhaul subnetwork implementing a functionality of access point of a same wireless communication network. To avoid conflicts of IP addresses, a monitoring of the presence of the main DHCP server is implemented, by a said node, to which the main DHCP server is connected. In the case where the first monitoring shows a disconnection of the main DHCP server, a backup DHCP server is activated in a node of the backhaul subnetwork. Then a general disconnection of the nodes of the backhaul subnetwork and of any device connected to the wireless communication coverage extension system is implemented. The IP address leases are then renewed by the backup DHCP server, following the general disconnection.

10 Claims, 6 Drawing Sheets (51) Int. Cl.
*H04L 61/5053* (2022.01)
*H04W 24/04* (2009.01)

(58) Field of Classification Search
CPC .... H04L 61/5053; H04L 61/59; H04W 24/04; H04W 88/08; H04W 88/14
See application file for complete search history.

(56) References Cited

U.S. PATENT DOCUMENTS

| | | | |
|---|---|---|---|
| 2007/0140239 A1* | 6/2007 | Bauer | H04L 61/5014 370/406 |
| 2008/0267259 A1* | 10/2008 | Budampati | H04B 1/7156 375/E1.037 |
| 2013/0166706 A1* | 6/2013 | Christenson | H04L 61/5014 709/221 |
| 2014/0173124 A1* | 6/2014 | Velayudhapillai | H04L 61/5014 709/228 |
| 2016/0112370 A1* | 4/2016 | Theogaraj | H04L 61/5014 709/245 |
| 2016/0219502 A1 | 7/2016 | Breton | |
| 2016/0261457 A1* | 9/2016 | Gupta | H04L 61/5014 |
| 2017/0163597 A1* | 6/2017 | Amerneni | H04L 61/5014 |
| 2020/0412690 A1* | 12/2020 | Miyamoto | H04L 61/5014 |

OTHER PUBLICATIONS

Saleem, Sara, Thienne Johnson, and Srinivasan Ramasubramanian. "Design of a self-forming, self-healing small-medium infrastructure wireless mesh network." 2013 IEEE International Conference on Sensing, Communications and Networking (SECON). IEEE, 2013. (Year: 2013).*

Feb. 20, 2020 International Search Report issued in International Patent Application No. PCT/EP2019/086231.

Bernard; "The Mini-DHCP Derver: draft-aboba-dhc-mini-04.txt" Interent Engineering Task Force IEIF; Standard Working Draft, Internet Society; No. 4; pp. 1 (line 1); pp. 6 (last line); Sep. 29, 2001.

Tjoens et al; "DHCP reconfigure extension;" Bernard; Internet Engineering Task Force Ietf Standard, Internet Society; pp. 2 (line 1); pp. 4 (last line); Dec. 1, 2001.

Droms et al; "DHCP Failover Protocal" pp. 1-133; Mar. 1, 2003.

* cited by examiner

METHOD AND SYSTEM FOR MANAGING DHCP SERVERS

TECHNICAL FIELD

The present invention relates to a DHCP ("Dynamic Host Configuration Protocol" as defined by the normative document RFC 1531, amended and supplemented by the normative documents RFC 1534, RFC 2131 and RFC 2132) management method and system intended for avoiding conflicts in IP (Internet Protocol as defined by the normative document RFC 791) addresses.

PRIOR ART

A local area network LAN based on a dynamic distribution of IP addresses must include a unique DHCP server. This unique DHCP server may in this case be a DHCP relay agent that serves as a proxy for another DHCP server that is located on another network connected to said local area network LAN by means of a router. The DHCP server provides leases to each requesting device of the local area network LAN, each lease indicating at least an IP address that must be used by the requesting equipment for communicating, as well as a duration of validity of the lease. The DHCP server may also supply router IP address information and/or information on an IP address of at least one DNS (Domain Name System as defined in the normative document RFC 6895) server.

In local area networks LAN at the subscribers of an internet access provider, the DHCP server forms part of a set of functionalities integrated in the gateways GW for access to the internet, and is therefore visible to any device connected to the local area network LAN.

Furthermore, in local area networks LAN, systems for extending wireless communication coverage may be used in order to increase the range of these local area networks LAN by coordinating a plurality of distributed access points AP. These various access points AP are integrated in interconnected nodes by means of a backhaul subnetwork and all make available a same wireless local area network WLAN. In the context of Wi-Fi (registered trade mark) technology, all these access points AP thus use the same SSID (Service Set IDentifier) and the same password (also referred to as a security key). Thus, the extension of coverage of wireless communication is transparent for the devices connected to the wireless local area network WLAN.

The wireless communication coverage extension system is thus typically connected to the internet through the gateway GW, for example by means of an Ethernet cord providing the connection of a main node of the wireless communication coverage extension system to the gateway. The wireless communication coverage extension system then serves as a relay between the gateway and each device connected by a cable or wireless link to the local area network LAN, and also serves as a relay between these various devices connected to the local area network LAN to enable them to communicate with each other.

The nodes of the backhaul subnetwork are connected to each other, a node then being able to serve as a relay between two other nodes of the backhaul subnetwork. The nodes are thus interconnected by means of cable connections, for example of the Ethernet type, or wireless connections, for example a Wi-Fi (registered trade mark) connection using an SSID identifier different from said local area network WLAN itself. The nodes of the backhaul subnetwork thus communicate with each other by means of logic links, for example IP communications or encrypted tunnels or communications in accordance with a proprietary communication protocol. These logic links are typically established by means of probe and discovery messages.

The nodes of the backhaul subnetwork are typically coordinated in a centralised manner, by a master node among said nodes of the backhaul subnetwork. The master node may be designated by fixed configuration or dynamically by election. In the case of the local area networks LAN at the subscribers of an internet access provider, the master node may be the node of the backhaul subnetwork that is directly connected to the internet access gateway GW. All the nodes of the backhaul subnetwork thus have knowledge of the master node and are capable of identifying it by means of its MAC (Medium Access Control) address.

In the case where the link between the wireless communication coverage extension system and the gateway GW breaks, it is desirable to maintain the functionality of exchanges of information between the devices connected to the local area network LAN, since these exchanges are independent of the access to the internet itself. In general, when the link between the DHCP server and the wireless communication coverage extension system breaks, it is desirable for the functionality of exchanges of information between the devices connected to the local area network LAN to be maintained.

Any communication within a network being regulated through IP addresses attributed to the devices connected to the local area network LAN, it is desirable to provide a solution that makes it possible to maintain the DHCP server function within the local area network LAN while avoiding addressing conflicts. It is in particular desirable to avoid these addressing conflicts when the link with the DHCP server is restored. These addressing conflicts are also to be avoided when this DHCP server is connected elsewhere in the local area network LAN. These addressing conflicts are also to be avoided when this DHCP server is replaced by another DHCP server. It is also desirable to avoid these addressing conflicts when a plurality of DHCP servers are connected to the wireless communication coverage extension system. It is also desirable to provide a solution that is simple, effective and low cost.

The patent document US 2014/0281029 A1 is in particular known, which discloses a solution making it possible, in an environment containing multiple DHCP servers, to route the messages of the DHCP protocol to one server in particular, but this requires a specific configuration of the DHCP servers. However, in many situations and in particular with regard to DHCP servers integrated in current internet access gateways, the DHCP servers do not offer such flexibility in configuration. Moreover, such DHCP servers are usually non-disengageable, which greatly amplifies the lack of flexibility offered and consequently the risks of occurrence of addressing-conflict situations.

The patent document US 2014/0325040 A1, is also known, which discloses a solution for duplicating the information from a main DHCP server to a backup DHCP server. The backup DHCP server can thus take over in the event of disconnection of the main DHCP by using information thus duplicated. Here also, it is necessary to modify the main DHCP server so that it allows such duplication, which cannot be envisaged in many situations and in particular with regard to the DHCP servers integrated in current internet access gateways.

It is then desirable to overcome these drawbacks of the prior art.

DISCLOSURE OF THE INVENTION

One object of the present invention is to propose a method for managing IP address leases in a wireless communication coverage extension system comprising a backhaul subnetwork comprising a set of interconnected nodes, a plurality of nodes of the backhaul subnetwork implementing an access point functionality of a same wireless communication network. The wireless communication coverage extension system being adapted for making it possible to connect devices to said nodes by means of the wireless communication network or by cable. The method comprises the following steps:

implementing a first monitoring of the presence of the main DHCP server, by a said node, to which the main DHCP server is connected;

and in the case where the first monitoring shows a disconnection of the main DHCP server:

requesting the activation, in a node of the backhaul subnetwork, of a backup DHCP server;

implementing a general disconnection of the nodes of the backhaul subnetwork and of any device connected to the wireless communication coverage extension system; and renewing the leases of IP addresses, by the backup DHCP server, following the general disconnection.

Thus, by virtue of the general disconnection, there is no conflict of IP addresses at the disconnection of the main DHCP server and the addressing made by the DHCP server is coherent from the point of view of any said node or of any device connected to the wireless communication coverage extension system.

According to a particular embodiment, to implement the general disconnection, the method comprises the following steps, by each said node: cancelling its own IP address lease; restarting any communication interface of said node that is not used for creating the backhaul subnetwork.

Thus the general disconnection is implemented simply.

According to a particular embodiment, when the backup DHCP server is activated, the method comprises the following steps:

implementing a second monitoring of connection of a new device to the wireless communication coverage extension system, by a monitoring mechanism in each said node;

and, in the case where the second monitoring shows a connection of a new device to a said node, referred to as connection node:

activating a logic barrier isolating the monitoring mechanism of the connection node with respect to the backup DHCP server, to make it possible to probe any presence of a DHCP server in the new device without the monitoring mechanism of the connection node suffering any interference on the part of the backup DHCP server;

probing the new device to determine whether or not the new device includes a DHCP server;

in the case where the new device does not include a DHCP server: deactivating the logic barrier and accepting the new device; and in the case where the new device does include a DHCP server, which thus becomes the main DHCP server: deactivating the backup DHCP server, deactivating the logic barrier, accepting the new device, implementing the general disconnection and renewing the IP address leases.

Thus, by virtue of the logic barrier, there is no conflict of IP addresses at the connection of the main DHCP server. And, by virtue of the general disconnection that follows the return of the main DHCP server, the addressing implemented by the main DHCP server in replacement for the backup DHCP server is coherent from the point of view of any said node or of any device connected to the wireless communication coverage extension system.

According to a particular embodiment, the method comprises the following steps: notifying said nodes that the wireless communication coverage extension system is in normal operational mode when the main DHCP server is active; and notifying said nodes that the wireless communication coverage extension system is in backup operational mode when the backup DHCP server is active.

Thus each said node can have a distinct second monitoring behaviour according to the operational mode in which the wireless communication coverage extension system is situated.

According to a particular embodiment, the method comprises the following steps:

implementing a second monitoring of connection of a new device to the wireless communication coverage extension system, by a monitoring mechanism in each said node;

and, in the case where the second monitoring shows a connection of a new device to a said node, referred to as connection node:

activating a logic barrier isolating the monitoring mechanism of the connection node with respect to the active DHCP server, whether it be the backup DHCP server or the main DHCP server, to make it possible to probe any presence of a DHCP server in the new device without the monitoring mechanism of the connection node suffering any interference on the part of the active DHCP server;

in normal operational mode, activating a supplementary logic barrier isolating the backhaul subnetwork with respect to the new device, so that only the monitoring mechanism of the connection node can receive any DHCP messages coming from the new device;

probing the new device to determine whether or not the new device includes a DHCP server;

in the case where the new device does not include a DHCP server: deactivating the logic barrier and where applicable the supplementary logic barrier, and accepting the new device;

in the case where the new device includes a DHCP server in normal operational mode, keeping the new device in isolation until said new device is disconnected; and in the case where the new device includes a DHCP server in backup operational mode, deactivating the backup DHCP server, deactivating the logic barrier, accepting the new device, implementing the general disconnection and renewing the IP address leases.

Thus, by virtue of the logic barrier, there is no conflict of IP addresses at the connection of the main DHCP server. And, by virtue of the general disconnection that follows the return of the main DHCP server, the addressing implemented by the main DHCP server in replacement for the backup DHCP server is coherent from the point of view of any said node or of any device connected to the wireless communication coverage extension system. In addition, by virtue of the supplementary logic barrier, the potential conflicts of IP addresses that would be caused by the entry of another DHCP server that would come to interfere with the main DHCP server are avoided.

According to a particular embodiment, the new device is probed by sending a DHCP Discover request and the new device includes a DHCP server when a DHCP Offer response is received in response to the DHCP Discover request.

Thus the potential DHCP functionality of the new device is easily probed.

According to a particular embodiment, the logic barrier is implemented by a firewall of the connection node configured for dropping any DHCP Offer response coming from the backhaul subnetwork and intended for the reconnection node.

Thus the logic barrier is easily implemented.

According to a particular embodiment, the backup DHCP server is activated in the node to which the main DHCP server was connected before disconnection.

The invention also relates to a computer program that can be stored on a medium and/or downloaded from a communication network, in order to be read by a processor. This computer program comprises instructions for implementing one or other of the methods mentioned above in any one of the embodiments thereof, when said program is executed by the processor. The invention also relates to an information storage medium storing such a computer program.

The invention also relates to a wireless communication coverage extension system comprising a backhaul subnetwork comprising a set of interconnected nodes, a plurality of nodes of the backhaul subnetwork implementing an access point functionality of the same wireless communication network. The wireless communication coverage extension system being adapted for making it possible to connect devices to said nodes by means of the wireless communication network or by cable. To manage IP address leases, the wireless communication coverage extension system comprises:
- means for monitoring the presence of the main DHCP server, by a said node, to which the main DHCP server is connected;
- and in the case where the monitoring shows a disconnection of the main DHCP server:
  - means for requesting the activation, in a node of the backhaul subnetwork, of a backup DHCP server;
  - means for implementing a general disconnection of the nodes of the backhaul subnetwork and of any device connected to the wireless communication coverage extension system; and
  - means for renewing the IP address leases, by the backup DHCP server, following the general disconnection.

The invention also relates to a node, called the master node, intended to be used in a wireless communication coverage extension system comprising a backhaul subnetwork comprising a set of interconnected nodes including the master node, a plurality of nodes of the backhaul subnetwork implementing an access point functionality of a same wireless communication network, the wireless communication coverage extension system being adapted for making it possible to connect devices to said nodes by means of the wireless communication network or by cable. To implement an IP address lease management, the master node comprises:
- means for monitoring the presence of the main DHCP server when the main DHCP server is connected to the master node;
- and, in the case where the monitoring by the master node, or a monitoring of the presence of the main DHCP server by another node of the backhaul subnetwork, shows a disconnection of the main DHCP server:
  - means for activating, in the master node, a backup DHCP server;
  - means for ordering a general disconnection of the nodes of the backhaul subnetwork and of any device connected to the wireless communication coverage extension system; and
  - means for renewing (406) the IP address leases, by the backup DHCP server, following the general disconnection.

BRIEF DESCRIPTION OF THE DRAWINGS

The features of the invention mentioned above, as well as others, will emerge more clearly from the reading of the following description of at least one example embodiment, said description being made in relation to the accompanying drawings, among which.

DETAILED DISCLOSURE OF EMBODIMENTS

Figure 1:
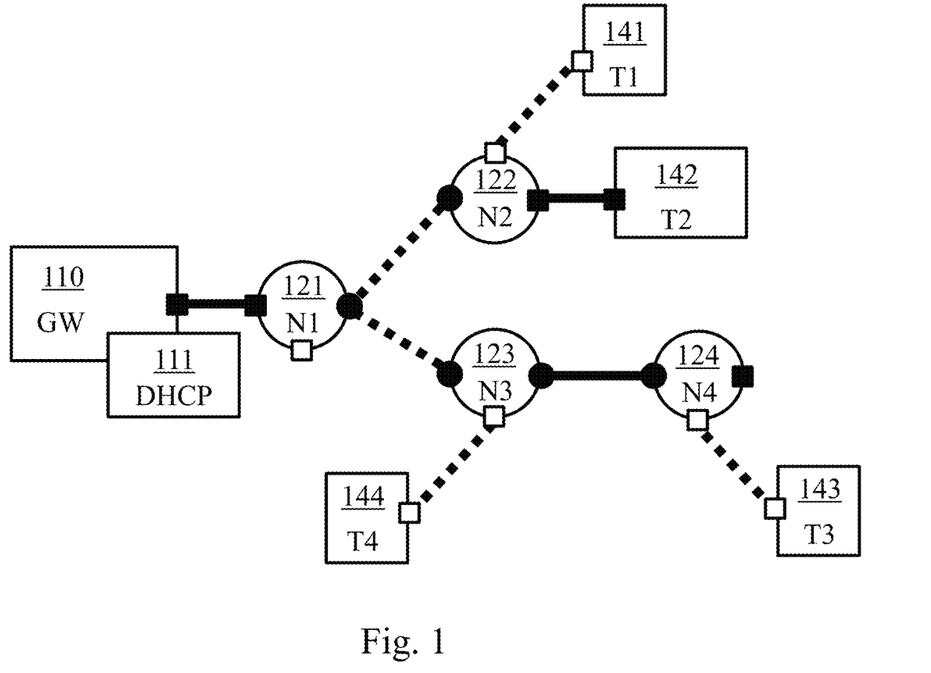
FIG. 1 illustrates schematically a communication system wherein the present invention can be implemented.

FIG. 1 illustrates schematically a communication system wherein the present invention can be implemented. The communication system comprises a wireless communication coverage extension system constructed around a backhaul subnetwork comprising a set of interconnected nodes N1 121, N2 122, N3 123, N4 124. Each node in a plurality of nodes in the backhaul subnetwork, typically all the nodes in the backhaul subnetwork, implements an access point AP functionality of a wireless local area network WLAN. The nodes in said plurality of nodes all make available the same wireless local area network WLAN (same name, etc.). In the context of Wi-Fi (registered trade mark) technology, all these access points AP thus use the same SSID identifier and the same password. The coverage area of the wireless local area network WLAN, and therefore in general terms of the local area network LAN thus formed around the wireless communication coverage extension system, is then extended in a way that is transparent for each terminal, or station, that connects thereto.

The nodes N1 121, N2 122, N3 123, N4 124 of the backhaul subnetwork are connected to each other (e.g. by means of a structure in tree form or a mesh structure), a node then being able to serve as a relay between two other nodes of the backhaul subnetwork. The nodes N1 121, N2 122, N3 123, N4 124 are thus interconnected by means of cable connections, for example of the Ethernet type, or wireless connections, for example a Wi-Fi (registered trade mark) connection using an SSID identifier different from said local area network WLAN itself. The nodes N1 121, N2 122, N3 123, N4 124 of the backhaul subnetwork thus communicate with each other by means of logic links, for example IP communications or encrypted tunnels or communications in accordance with a proprietary communication protocol.

By way of illustration, FIG. 1 shows that the node N1 121 is connected to the node N2 122 and to the node N3 123 by means of a wireless connection, and the node N4 124 is connected to the node N3 123 by means of a cable connection.

The wireless communication coverage extension system thus makes it possible to interconnect a gateway GW 110 for access to the internet, a terminal T1 141, a terminal T2 142, a terminal T3 143 and a terminal T4 144. The gateway GW 110 implements a DHCP server functionality 111, here referred to as the main DHCP server. The terminal T1 141 is for example a smartphone connected by a wireless connection to the node N2 122, that is to say the terminal T1 141 is thus connected via the wireless local area network WLAN by means of the node N2 122 acting as an access point AP. The terminal T2 142 is for example a television set connected by a cable connection to the node N2 122. The terminal T3 143 is for example a tablet connected by a wireless connection to the node N4 124, that is to say the terminal T3 143 is thus connected via the wireless local area network WLAN by means of the node N4 124 acting as an access point AP. The terminal T4 144 is for example a network-attached storage unit NAS connected by a wireless connection to the node N3 123, that is to say the terminal T4 144 is thus connected via the wireless local area network WLAN by means of the node N3 123 acting as an access point AP.

The nodes of the backhaul subnetwork are coordinated in a centralised manner, by a master node among said nodes of the backhaul subnetwork. The master node can be designated by fixed configuration or dynamically by election. The master node is for example the node of the backhaul subnetwork that is directly connected to the gateway GW for access to the internet, namely the node N1 121 in the context of FIG. 1. All the nodes of the backhaul subnetwork thus have knowledge of the master node, and are capable of identifying it by means of its MAC address.

Figure 2:
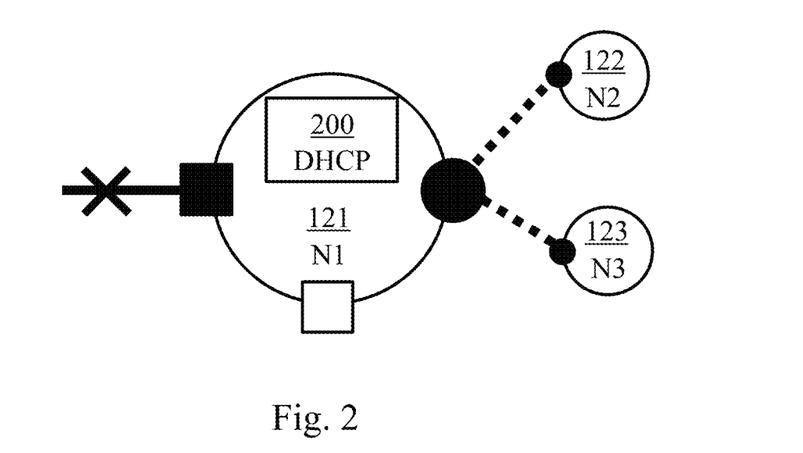
FIG. 2 illustrates schematically a master node in a backhaul subnetwork of the communication system in FIG. 1.

In the context of the present invention, as illustrated schematically in FIG. 2, the master node N1 121 implements a disengageable functionality of the backup DHCP server 200 in order to manage the IP address leases in the event of disconnection of the main DHCP server. As described hereinafter, the backup DHCP server is thus selectively activated when the main DHCP server is disconnected from the wireless communication coverage extension system.

Figure 3:
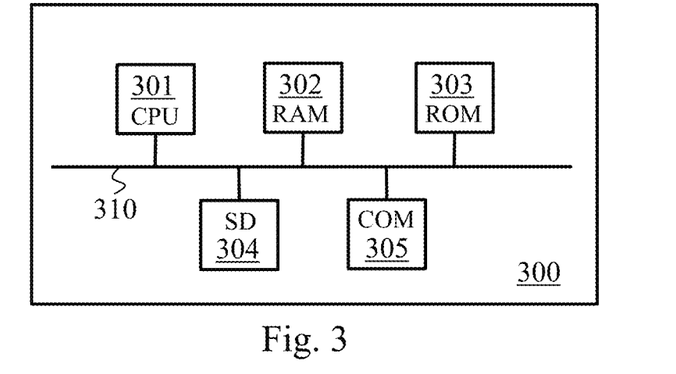
FIG. 3 illustrates schematically an example of hardware arrangement of nodes of the backhaul subnetwork.

FIG. 3 illustrates schematically an example of hardware architecture of any node 300 of the backhaul subnetwork.

The example of hardware architecture presented comprises, connected by a communication bus 310: a processor CPU (central processing unit) 301; a random access memory RAM 302, a read only memory ROM 303 or a flash memory; a storage unit or a storage medium reader, such as an SD (Secure Digital) card reader 304 or a hard disk HDD (hard disk drive); and at least one set of communication interfaces COM 305. The set of communication interfaces COM 305 makes it possible to implement the access point functionality AP for extending the coverage of the wireless local area network WLAN, to connect terminals or the gateway GW 110 by cable and to establish the backhaul subnetwork.

The processor CPU 301 is capable of executing instructions loaded in the RAM memory 302 from the ROM memory 303, from an external memory (such as an SD card), from a storage medium (such as the hard disk HDD), or from a communication network. On powering up, the processor CPU 301 is capable of reading instructions from the RAM memory 302 and executing them. These instructions form a computer program causing the implementation, by the processor CPU 301, of all or some of the algorithms and steps described hereinafter.

Thus all or some of the algorithms and steps described hereinafter can be implemented in software form by executing a set of instructions by a programmable machine, such as a DSP (digital signal processor) or a microcontroller or a processor. All or some of the algorithms and steps described hereinafter can also be implemented in hardware form by a machine or a dedicated component, such as an FPGA (field-programmable gate array) or an ASIC (application-specific integrated circuit). Thus the nodes N1 121, N2 122, N3 123, N4 124 comprise electronic circuitry adapted and configured for implementing the algorithms and steps described hereinafter.

Figure 4:
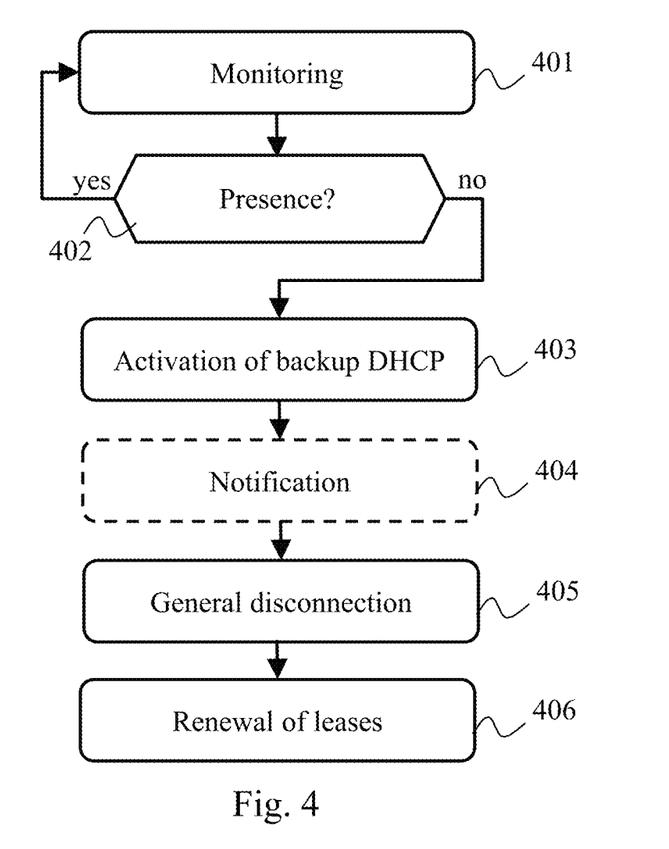
FIG. 4 illustrates schematically an algorithm for activating a backup DHCP server in the master node.

FIG. 4 illustrates schematically an algorithm for activating the backup DHCP server 200 in the master node.

In a step 401, the node to which the main DHCP server 111 is connected, i.e. the node N1 121 in FIG. 1, monitors whether the main DHCP server 111 is or is not still connected to the wireless communication coverage extension system. The main DHCP server 111 may be present in a device connected by cable, or by wireless via the wireless local area network WLAN, to the wireless communication coverage extension system. When the main DHCP server 111 is integrated in the gateway GW 110, the node N1 121 can simply monitor whether or not the gateway GW 110 is still connected to the wireless communication coverage extension system. For example, when the node N1 121 is based on a Linux operating system, NETLINK events can be used to implement this monitoring, in particular the event RTMGRP_LINK that takes the state UP or DOWN according to the physical state of the connection in question. Each of the changes in state of the physical connection instantaneously generates a corresponding NETLINK event, which enables the node N1 121 to detect that the gateway GW 110 has been disconnected.

In a step 402, the node N1 121 checks whether the main DHCP server 111 is still connected to the wireless communication coverage extension system. If such is the case, the step 401 is repeated; otherwise a step 403 is performed.

In the step 403, the node N1 121 activates the backup DHCP server 200. If the monitoring of the step 401 is implemented by a node other than the master node (i.e. by a node other than the one that implements the backup DHCP sever 200), then this other node informs the master node that the main DHCP server 111 has been disconnected so that the master node can activate the backup DHCP server 200 in response to the disconnection of the main DHCP server 111. This is because the master node (i.e. the one that implements the backup DHCP server 200, is preferentially the node of the wireless communication coverage extension system that is connected to the main DHCP server 111, but may also in a variant be another node of the wireless communication coverage extension system.

In an optional step 404, the master node notifies the other nodes of the wireless communication coverage extension system that the backup DHCP server 200 has been activated. All the nodes then note that the backup DHCP server 200 has been activated (entry to backup operational mode).

In a step 405, the master node instructs the other nodes of the wireless communication coverage extension system to implement a general disconnection of the local area network LAN. It should be noted that the steps 404 and 405 can be performed in a single step wherein the master node sends a message requesting general disconnection of the local area network LAN that includes supplementary information indicating that the backup DHCP server 200 has been activated (entry to backup operational mode).

For executing the general disconnection, each of the nodes of the wireless communication coverage extension system:
  cancels its own IP address lease;
  restarts any communication interface that is not used for creating the backhaul subnetwork, namely restarting any wireless communication interface that is not used for creating the backhaul subnetwork (i.e. restarting any wireless communication interface connected to the wireless local area network WLAN), which involves cancelling all the leases of the devices connected at this moment to the wireless local area network WLAN, and restarting any cable communication interface that is not being used for creating the backhaul subnetwork, which involves cancelling all the leases of the devices connected by cable to the wireless communication coverage extension system.

Restarting these interfaces forces the devices that were connected thereto to reconnect and to request a lease renewal in order to obtain an IP address in conformity with the policy for attributing IP addresses by the DHCP server in place (in this case, at this moment, the backup DHCP server 200).

Thus, in a step 406, the master node, or more particularly the backup DHCP server 200, renews the leases for all the devices connected to the LAN network (including the nodes of the wireless communication coverage extension system). The backup DHCP server 200, to do this, processes the DHCP requests that come from the various devices of the local area network LAN, including those coming from the nodes of the wireless communication coverage extension system. A complete renewal of the IP addresses of the local area network LAN is therefore implemented, which avoids any conflict of IP address with the IP address attribution policy previously established by the main DHCP server 111.

Figure 5:
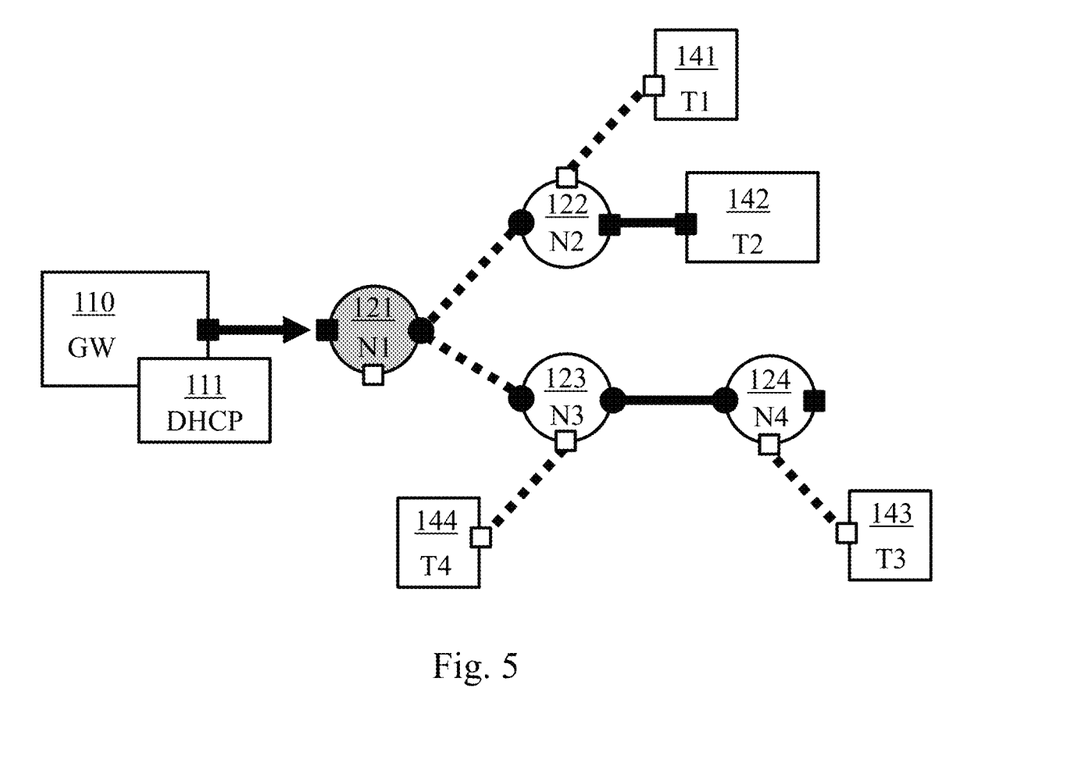
FIG. 5 illustrates schematically the communication system at the time of a reconnection of a main DHCP server.

FIG. 5 illustrates schematically the communication system when a main DHCP server 111 is reconnected. In FIG. 5, the gateway GW 110 that includes the main DHCP server 111 is reconnected to the node N1 121. The gateway GW 110 may in a variant be reconnected to another node of the wireless communication coverage extension system. In another variant, a device other than the gateway GW 110 is connected to the wireless communication coverage extension system, this other device including a DHCP server that is also not disengageable (as is the case with the DHCP server 111 of the gateway GW 110).

Figure 6:
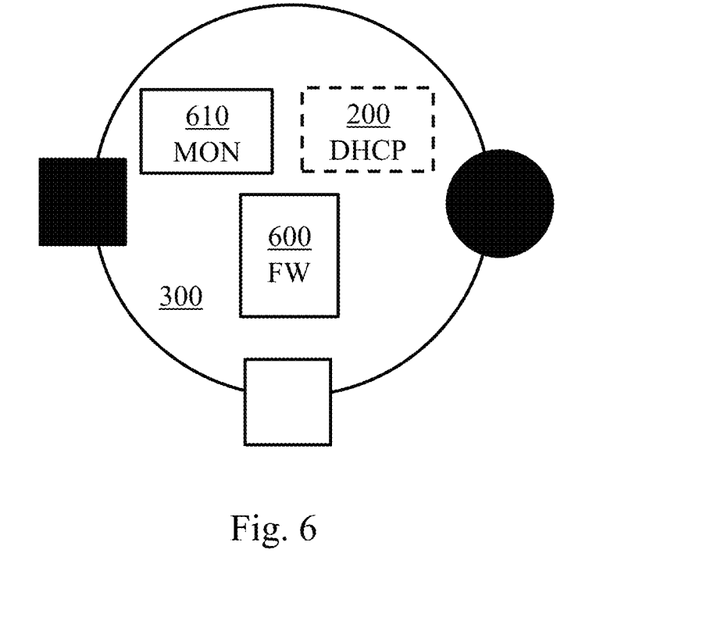
FIG. 6 illustrates schematically a configuration of a node of the backhaul subnetwork when the backup DHCP server is activated.

To make it possible to detect the connection of such a DHCP server when the wireless communication coverage extension system is in backup operational mode, each node implements a monitoring mechanism MON 610 and a firewall FW 600, as illustrated in FIG. 6. The monitoring mechanism MON 610 monitors, on any communication interface that is not being used for creating the backhaul subnetwork, any appearance of a new device. In the event of the appearance of a new device, protective measures are taken by means of a particular configuration of the firewall 600, in order to create a logic barrier avoiding IP address conflicts. This aspect is detailed hereinafter.

Figure 7:
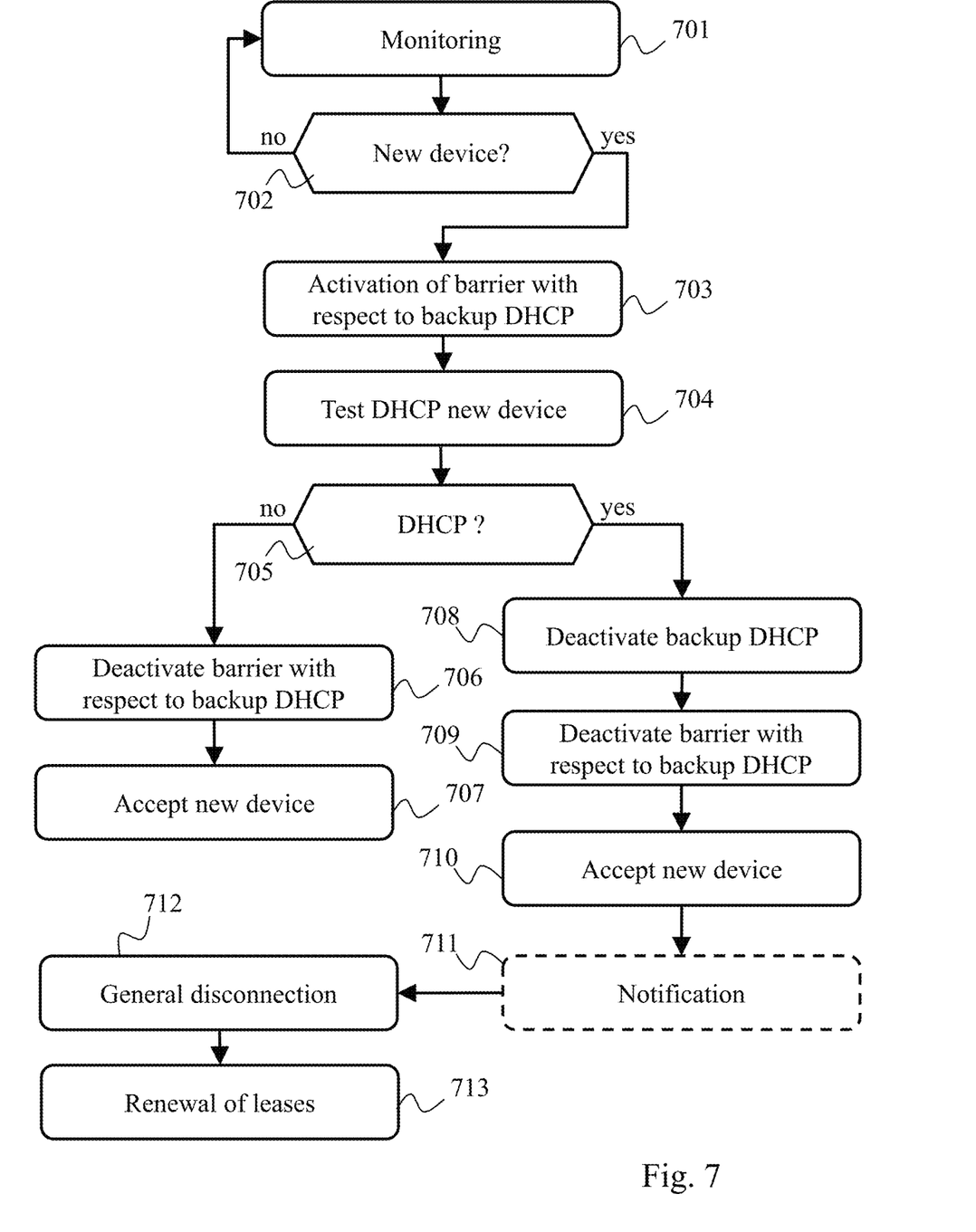
FIG. 7 illustrates schematically an algorithm for deactivating the backup DHCP server in a particular embodiment.

FIG. 7 illustrates schematically an algorithm for deactivating the backup DHCP server 200, in a particular embodiment.

In a step 701, each node of the wireless communication coverage extension system monitors whether a new device is connected thereto, whether by means of a wireless connection or by means of a cable connection. For example, as already indicated, when the nodes are based on a Linux operating system, NETLINK events can be used for implementing this monitoring.

In a step 702, each node checks whether a new device is connected thereto. If such is the case, a step 703 is performed; otherwise the step 701 is repeated.

In the step 703, the node that detected the connection of a new device to one of its interfaces that is not being used for creating the backhaul subnetwork activates a logic barrier vis-à-vis the backup DHCP server 200. The logic barrier isolates the monitoring mechanism MON 610 of the node in question vis-à-vis the backup server DHCP 200 to make it possible to probe a possible presence of a DHCP server in the newly connected device without the monitoring mechanism MON 610 suffering any interference on the part of the backup DHCP server 200.

In a particular embodiment, the logic barrier rejects any "DHCP Offer" response transmitted via the UDP (User Datagram Protocol as defined in the normative document RFC 768), coming from the backhaul subnetwork and intended for the node that activated said logic barrier. Consequently the monitoring mechanism MON 610 does not suffer any interference on the part of the backup DHCP server 200. For example, the firewall FW 600 is configured to implement a dropping of any "DHCP Offer" response coming from the backhaul subnetwork and intended for the node that activated said logic barrier (INPUT clause of the firewall FR 600).

In a particular embodiment, the logic barrier furthermore isolates the newly connected device with respect to the backup DHCP server 200, to enable the monitoring mechanism MON 610 to probe the possible presence of a DHCP server in the newly connected device without the newly connected device suffering any interference on the part of the backup DHCP server 200. Thus, in a particular embodiment, the logic barrier rejects any "DHCP Offer" response coming from the backhaul subnetwork and passing through the node that activated said logic barrier. For example, the firewall FW 600 is considered to implement a dropping of any "DHCP Offer" response coming from the backhaul subnetwork and passing through the node that activated said logic barrier (THROUGH clause of the firewall).

Many other methods may be used for creating a logic barrier that isolates the monitoring mechanism MON 610, and optionally the newly connected device, with respect to the backup DHCP server 200.

In a step 704, the monitoring mechanism MON 610 of the node that detected the connection of the new device performs a DHCP test with said new device. In other words, the monitoring mechanism MON 610 probes the new device to determine whether said new device includes a DHCP server. In a particular embodiment, the monitoring mechanism MON 610 broadcasts a DHCP Discover request. This request is thus received by all the devices connected to the local network LAN, including the master node and therefore the backup DHCP server 200. Each DHCP server present in the local area network LAN then transmits, in unicast mode, to the node that detected the connection of the new device, a DHCP Offer response in return. The response of the backup DHCP server 200 is then blocked by the logic barrier activated at the step 703. If the newly connected device includes a DHCP server, the monitoring mechanism MON 610 then receives the "DHCP Offer" response coming from this incorporated DHCP server. Otherwise, without any response after the expiry of a time delay of predefined duration, the monitoring mechanism MON 610 considers that the newly connected device does not include a DHCP server.

In a step 705, the monitoring mechanism MON 610 checks whether the test performed at the step 704 concludes that the newly connected device includes a DHCP server. If such is the case, the backup DHCP server 200 must give way to the DHCP server thus introduced (or reintroduced) in the local area network LAN, and a step 708 is performed; otherwise a step 706 is performed.

In the step 706, the node that detected the connection of the new device at one of the interfaces thereof that is not being used for creating the backhaul subnetwork deactivates the logic barrier that had been established at the step 703.

In a step 707, the node accepts the new device in the local area network LAN, and the algorithm in FIG. 7 is ended.

In the step 708, if the node that detected the connection of the new device to one of the interfaces thereof that is not being used for creating the backhaul subnetwork is the master node, the master node deactivates the backup DHCP server 200. Otherwise the node in question informs the master node that a DHCP server, to be considered henceforth as the main DHCP server, has been connected; then the master deactivates the backup DHCP server 200.

In a step 709, the node that detected the connection of the new device to one of the interfaces thereof that is not being used for creating the backhaul subnetwork deactivates the logic barrier that had been established at the step 703.

In a step 710, the node in question accepts the new device in the local area network LAN.

In an optional step 711, the master node notifies the other nodes of the wireless communication coverage extension system that the backup DHCP server 200 has been deactivated. All the nodes then note that the backup DHCP server 200 has been deactivated (return to normal operational mode). The fact that each node knows in which operational mode the wireless communication coverage extension system is situated makes it possible to activate the monitoring mechanism MON 610 solely in backup operational mode.

In a step 712, the master node instructs the other nodes of the wireless communication coverage extension system to perform a general disconnection of the local area network LAN. It should be noted that the steps 711 and 712 may be performed in a single step wherein the master node sends a message requesting general disconnection of the local area network LAN that includes supplementary information indicating that the backup DHCP server 200 has been deactivated (return to normal operational mode). To implement the general disconnection, each of the nodes of the wireless communication coverage extension system proceeds as already described in relation to FIG. 4.

Thus, in a step 713, the main DHCP server implements lease renewals for all the devices connected to the LAN network (including the nodes of the wireless communication coverage extension system). The main DHCP server, to do this, processes the DHCP requests that come from the various devices of the local area network LAN, including those coming from the nodes of the wireless communication coverage extension system. A complete renewal of the IP addresses of the local area network LAN is therefore implemented, which avoids any IP address conflict with the IP address attribution policy previously established by the backup DHCP server 200.

Figure 8:
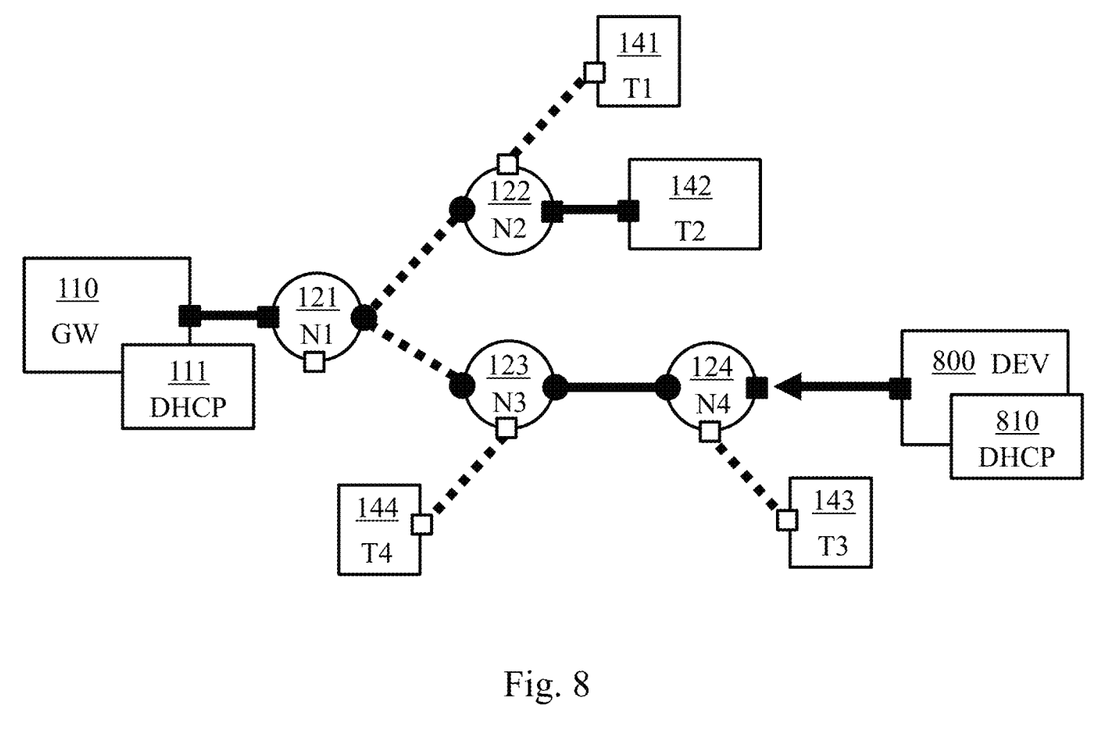
FIG. 8 illustrates schematically the communication system when a conflicting DHCP server is connected.

In a particular embodiment, the wireless communication coverage extension system is able to manage conflicts of any non-disengageable DHCP servers that are connected thereto. FIG. 8 illustrates schematically the communication system when a conflicting DHCP server is connected while the main DHCP server 111 is already active. The conflicting DHCP server 810 is included in a device DEV 800 that is connected to the node N4 124. The device DEV 800 may be connected by cable connection or wireless connection.

Figure 9:
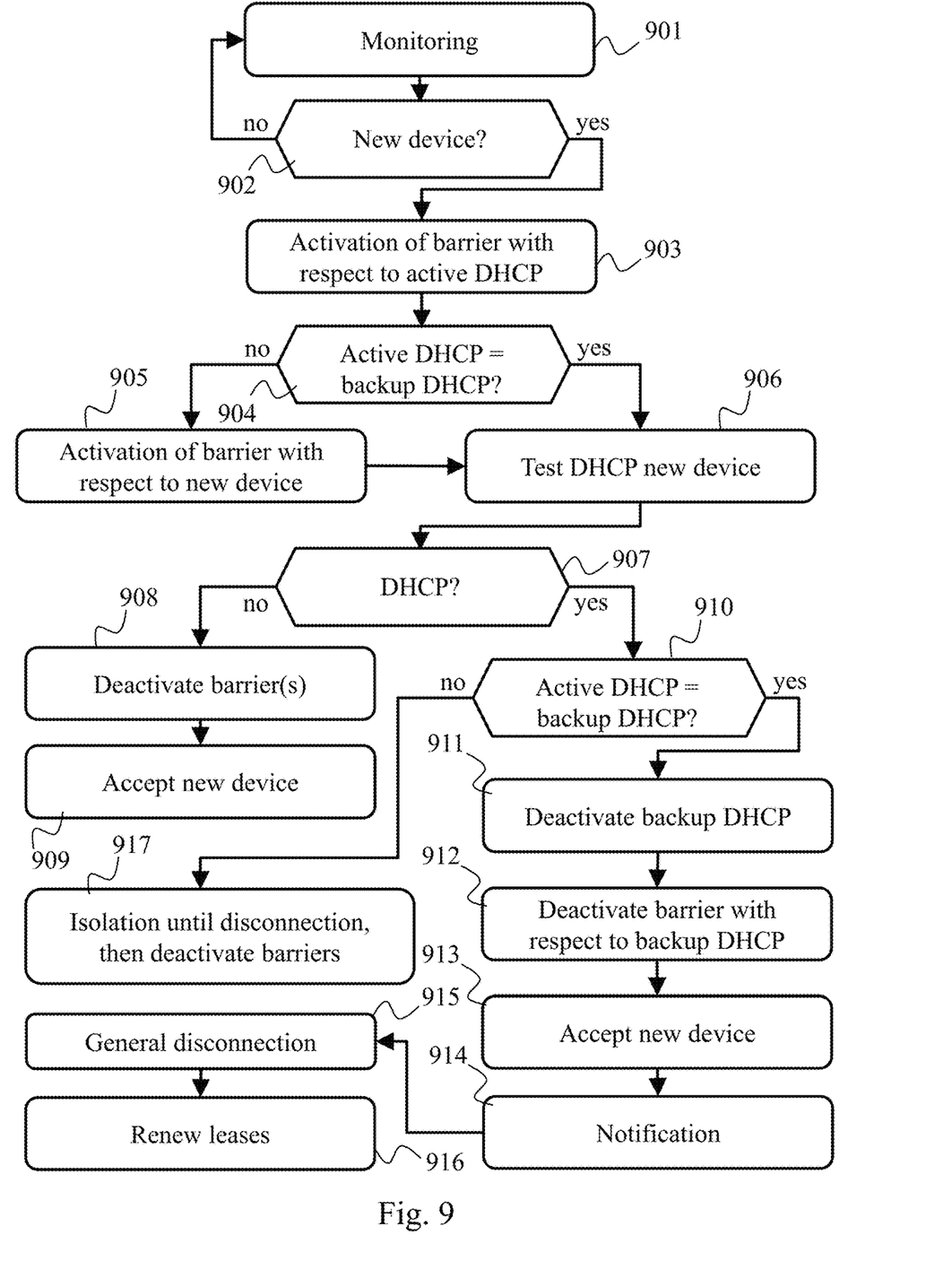
FIG. 9 illustrates schematically an algorithm for deactivating the backup DHCP server in another particular embodiment.

FIG. 9 illustrates schematically an algorithm for deactivating the backup DHCP server 200 in a particular embodiment relating to FIG. 8. It should be noted that, in this context, when there is any activation of the backup DHCP server 200, the step 404 is not optional. Each node of the wireless communication coverage extension system must know which operational mode is current.

In a step 901, each node of the wireless communication coverage extension system monitors whether a new device is connected to it, whether by means of a wireless connection or by means of a cable connection. For example, as already indicated, when the nodes are based on a Linux operating system, NETLINK events may be used for implementing this monitoring.

In a step 902, each node checks whether a new device is connected thereto. If such is the case, a step 903 is performed; otherwise the step 901 is repeated.

In the step 903, the node that detected the connection of a new device to one of the interfaces thereof that is not being used for creating the backhaul subnetwork activates a logic barrier with respect to the active DHCP server, whether this be the backup DHCP server 200 or the main DHCP server 111. The logic barrier in question corresponds to that of the step 703 already described.

In the step 904, the node in question determines whether the active DHCP server is the main DHCP server 111 or the backup DHCP server 200. In other words, the node in question determines whether the wireless communication coverage extension system is in normal operational mode or in backup operational mode. In normal operational mode, a step 905 is performed; in backup operational mode, a step 906 is performed.

In the step 905, the node in question activates a supplementary logic barrier for preventing any DHCP message that could be sent by the newly connected device to use the backhaul subnetwork. In other words, the supplementary logic barrier isolates the backhaul subnetwork with respect to the newly connected device, so that only the monitoring mechanism MON 610 can receive any DHCP messages coming from said newly connected device. For example, the firewall FW 600 is configured to implement a dropping of any DHCP message coming from the newly connected device and intended to be propagated via the backhaul subnetwork (THROUGH clause of the firewall FW 600). Then the step 906 is performed.

In a step 906, the monitoring mechanism MON 610 of the node that has detected the connection of the new device performs a DHCP test with said new device. In other words, the monitoring mechanism MON 610 probes the new device to determine whether said new device includes a DHCP server, as already described in relation to the step 704.

In a step 907, the monitoring mechanism MON 610 checks whether the test performed at the step 906 concludes that the newly connected device includes a DHCP server. If such is the case, a step 910 is performed; otherwise a step 908 is performed.

In the step 908, the node in question deactivates the logic barrier that was established at the step 903, as well as the supplementary logic barrier that was optionally established at the step 905.

In a step 909, the node in question accepts the new device in the local area network LAN, and the algorithm of FIG. 9 is ended.

In the step 910, the node in question determines whether the active DHCP server is the main DHCP server 111 or the backup DHCP server 200, as at the step 904. In normal operational mode, a step 911 is performed; in backup operational mode, a step 912 is performed.

In the step 911, the node in question maintains the isolation of the DHCP server of the newly connected device to prevent any IP address conflicts with the main DHCP server 111, and this until the newly connected device is disconnected. Next, the node in question deactivates the logic barrier that was established at the step 903, as well as the supplementary logic barrier that was established at the step 905; then the algorithm in FIG. 9 is ended.

In the step 912, the backup DHCP server 200 must give way to the DHCP server thus introduced (or reintroduced) in the local area network LAN, which then becomes the main DHCP server. Consequently, if the node that detected the connection of the new device to one of the interfaces thereof that is not being used for creating the backhaul subnetwork is the master node, the master node deactivates the backup DHCP server 200. Otherwise the node in question informs the master node that a DHCP server, to be considered henceforth as the main DHCP server, has been connected; then the master node deactivates the backup DHCP server 200.

In a step 913, the node that detected the connection of the new device at one of the interfaces thereof that is not being used for creating the backhaul subnetwork deactivates the logic barrier that had been established at the step 903.

In a step 914, the node in question accepts the new device in the local area network LAN.

In a step 915, the master node notifies the other nodes of the wireless communication coverage extension system that the backup DHCP server 200 has been deactivated. All the nodes then note that the backup DHCP server 200 has been deactivated (return to normal operational mode). The fact that each node knows in which operational mode the wireless communication coverage extension system is situated makes it possible to determine whether or not it is necessary to activate the supplementary logic barrier and, in the case of the introduction of a new device including a DHCP server, to determine whether the latter must be maintained in isolation or adopt the role of main DHCP server. It should be noted that, in the embodiment in FIGS. 8 and 9, the monitoring mechanism MON 610 is permanently activated.

In a step 916, the master node instructs the other nodes of the wireless communication coverage extension system to implement a general disconnection of the local area network LAN. It should be noted that the steps 915 and 916 may be performed in a single step wherein the master node sends a message requesting general disconnection of the local area network LAN that includes supplementary information indicating that the backup DHCP server 200 has been deactivated (return to normal operational mode). To implement the general disconnection, each of the nodes of the wireless communication coverage extension system proceeds as already described in relation to FIG. 4.

Thus, in a step 917, the main DHCP server implements lease renewals for all the devices connected to the LAN network (including the nodes of the wireless communication coverage extension system). The main DHCP server, to do this, processes the DHCP requests that come from the various devices of the local area network LAN, including those coming from the nodes of the wireless communication coverage extension system. A complete renewal of the IP addresses of the local area network LAN is then implemented, which avoids any IP address conflict with the IP address attribution policy previously established by the backup DHCP server 200.

The invention claimed is:

1. A method for managing IP address leases in a wireless communication coverage extension system comprising a backhaul subnetwork comprising a set of interconnected nodes, a plurality of nodes among said interconnected nodes implementing an access point functionality of the wireless communication coverage extension system, the wireless communication coverage extension system being adapted for communicatively connecting devices to said interconnected nodes by wireless communication or by cable, the method comprising:
   implementing a first monitoring of the presence of a main DHCP server by a node of said interconnected nodes to which the main DHCP server is connected;
   determining, by said first monitoring, a disconnection of the main DHCP server has occurred; and
   in response to the disconnection of the main DHCP server being determined by said first monitoring to have occurred:
      requesting activation, in said node implementing said first monitoring, of a backup DHCP server;
      implementing a general disconnection of said interconnected nodes and of any device connected to the wireless communication coverage extension system; and
      renewing IP address leases, by the backup DHCP server, following said general disconnection,
   wherein implementing said general disconnection comprises, by each node of said interconnected nodes:
      cancelling its own IP address lease; and
      restarting any communication interface of said node that is not used for creating the backhaul subnetwork.

2. The method according to claim 1, wherein, in response to the backup DHCP server being activated, the method comprises:
   implementing a second monitoring of connection of a new device to the wireless communication coverage extension system, by a monitoring mechanism in each of said interconnected nodes; and
   in response to the second monitoring showing a connection of a new device to an interconnected node, referred to as connection node:
      activating a logic barrier isolating the monitoring mechanism of the connection node with respect to the backup DHCP server, thereby enabling probing any presence of a DHCP server in the new device without the monitoring mechanism of the connection node suffering any interference on the part of the backup DHCP server;
      probing the new device to determine whether or not the new device includes a DHCP server;
      in response to the new device not including a DHCP server:

deactivating the logic barrier and accepting the new device; and in response to the new device including a DHCP server, which thus becomes the main DHCP server:

deactivating the backup DHCP server, deactivating the logic barrier, accepting the new device, implementing the general disconnection and renewing the IP address leases.

3. The method according to claim 2, wherein the new device is probed by sending a DHCP Discover request and the new device includes a DHCP server when a DHCP Offer response is received in response to the DHCP Discover request.

4. The method according to claim 3, wherein the logic barrier is implemented by a firewall of the connection node configured for dropping any DHCP Offer response coming from the backhaul subnetwork and intended for the connection node.

5. The method according to claim 1, wherein the method comprises:

notifying said interconnected nodes that the wireless communication coverage extension system is in normal operational mode in response to the main DHCP server being active; and notifying said interconnected nodes that the wireless communication coverage extension system is in backup operational mode in response to the backup DHCP server being active.

6. The method according to claim 5, wherein the method comprises:

implementing a second monitoring of connection of a new device to the wireless communication coverage extension system, by a monitoring mechanism in each said interconnected nodes; and in response to the second monitoring showing a connection of a new device to an interconnected node, referred to as connection node:

activating a logic barrier isolating the monitoring mechanism of the connection node with respect to the active DHCP server, thereby enabling probing any presence of a DHCP server in the new device without the monitoring mechanism of the connection node suffering any interference on the part of the active DHCP server;

in normal operational mode, activating a supplementary logic barrier isolating the backhaul subnetwork with respect to the new device, so that only the monitoring mechanism of the connection node can receive any DHCP messages coming from the new device;

probing the new device to determine whether or not the new device includes a DHCP server;

in response to a determination by said probing that the new device does not include a DHCP server, deactivating the logic barrier and where applicable the supplementary logic barrier, and accepting the new device;

in response to a determination by said probing that the new device includes a DHCP server in normal operational mode, keeping the new device in isolation until said new device is disconnected; and in response to a determination by said probing the new device includes a DHCP server in backup operational mode, deactivating the backup DHCP server, deactivating the logic barrier, accepting the new device, implementing the general disconnection and renewing the IP address leases.

7. The method according to claim 1, wherein the backup DHCP server is activated in the node to which the main DHCP server is connected before disconnection.

8. A non-transitory information storage medium storing a computer program comprising instructions for implementing, by a processor, said method according to claim 1, when said program is read and executed by said processor.

9. A wireless communication coverage extension system comprising a backhaul subnetwork comprising a set of interconnected nodes, a plurality of nodes among said interconnected nodes implementing an access point functionality of the wireless communication coverage extension system, the wireless communication coverage extension system being adapted for communicatively connecting devices to said interconnected nodes by wireless communication or by cable, the wireless communication coverage extension system further comprising an electronic circuitry to manage IP address leases the electronic circuitry adapted and configured for:

monitoring a presence of a main DHCP server by a node of said interconnected nodes to which the main DHCP server is connected;

determining, by said monitoring, a disconnection of the main DHCP server has occurred; and in response to the monitoring showing the disconnection of the main DHCP server:

requesting activation, in a node of the backhaul subnetwork, of a backup DHCP server;

implementing a general disconnection of the nodes of said interconnected nodes and of any device connected to the wireless communication coverage extension system; and renewing IP address leases, by the backup DHCP server, following the general disconnection, wherein implementing said general disconnection comprises, by each node of said interconnected nodes:

cancelling its own IP address lease; and restarting any communication interface of said node that is not used for creating the backhaul subnetwork.

10. A master node of a wireless communication coverage extension system comprising a backhaul subnetwork comprising a set of interconnected nodes including the master node, a plurality of nodes among said interconnected nodes implementing an access point functionality of the wireless communication coverage extension system, the wireless communication coverage extension system being adapted for communicatively connecting devices to said interconnected nodes by wireless communication or by cable, the master node comprising an electronic circuitry to implement an IP address lease management, the electronic circuitry adapted and configured for:

monitoring a presence of a main DHCP server when the main DHCP server is connected to the master node;

determining, by said monitoring, a disconnection of the main DHCP server has occurred; and in response to the monitoring by the master node, or a monitoring of the presence of the main DHCP server by another node of the backhaul subnetwork, showing the disconnection of the main DHCP server:

activating, in the master node, a backup DHCP server;

ordering a general disconnection of said interconnected nodes and of any device connected to the wireless communication coverage extension system; and renewing IP address leases, by the backup DHCP server, following the general disconnection, wherein implementing said general disconnection comprises, by each node of said interconnected nodes:
  cancelling its own IP address lease; and
  restarting any communication interface of said node that is not used for creating the backhaul subnetwork.

* * * * *